United States Patent [19]

Ciampa et al.

[11] Patent Number: 4,635,136
[45] Date of Patent: Jan. 6, 1987

[54] METHOD AND APPARATUS FOR STORING A MASSIVE INVENTORY OF LABELED IMAGES

[75] Inventors: John A. Ciampa, Victor; James T. Robinson, Dobbs Ferry, both of N.Y.

[73] Assignee: Rochester Institute of Technology, Rochester, N.Y.

[21] Appl. No.: 818,070

[22] Filed: Jan. 13, 1986

Related U.S. Application Data

[63] Continuation of Ser. No. 577,634, Feb. 6, 1984, abandoned.

[51] Int. Cl.$^4$ .............................................. H04N 5/785
[52] U.S. Cl. .................................... 358/342; 364/900
[58] Field of Search ............. 364/521, 464, 200, 900; 360/33.1, 35.1; 358/335, 342, 906

[56] References Cited

U.S. PATENT DOCUMENTS

| | | | |
|---|---|---|---|
| 4,041,463 | 8/1977 | Slutzky et al. | 364/900 |
| 4,133,034 | 1/1979 | Etter | 364/464 |
| 4,264,808 | 4/1981 | Owens et al. | 358/342 |
| 4,295,154 | 10/1981 | Hata et al. | 360/33.1 |
| 4,360,876 | 11/1982 | Girault et al. | 364/521 |
| 4,387,296 | 6/1983 | Newell et al. | 364/464 |
| 4,396,942 | 8/1983 | Gates | 358/107 |
| 4,425,586 | 1/1984 | Miller | 358/335 |
| 4,449,198 | 5/1984 | Kroon et al. | 358/342 |
| 4,490,747 | 12/1984 | Yokoyama | 358/342 |

OTHER PUBLICATIONS

Kenney, "Special Purpose Applications of the Optical Videodisc System", IEEE Trans. on Consumer Electronics, Nov. 1976, pp. 327-337.
"Marsh Realty Video Set Makes Home Hunting Easy", *Journal Messenger* (Manassas, Va.), Apr. 10, 1972.
Free, "Through the Electronic Looking Glass into Living Pictures", Popular Science, Aug. 1981, pp. 68-70.

*Primary Examiner*—Donald McElheny, Jr.
*Attorney, Agent, or Firm*—Martin LuKacher

[57] ABSTRACT

A massive inventory of labeled images, for example of every real estate parcel in a city, is produced on different frames of a video disc, from which the images may be randomly accessed for use in tax assessment, real estate sales and the like. Digital information is accessed from memory (e.g., magnetic disc) associated with a computer and monitored to define a route for a field rig, equipped with a video camera, which scans the images and provides TV signals in the order in which the digital information corresponding thereto is accessed. Each video image is labeled with text from the digital information corresponding to the image to produce TV signals with labeling information therein. Pluralities of frames of the TV signals are recorded on a video recorder. A single frame is selected from each plurality and recorded on a different frame of the video disc record.

16 Claims, 20 Drawing Figures

159 SMITH ST. 107-65

TYPICAL "OPERATOR AIDS SCREEN"

```
  * 128 JONES ST.   *   2SB
  * 130 JONES ST.   *   2SA

** 134 JONES ST.  **   1SB

* 136 JONES ST.   *   VACANT (NO PIC)
  * 138 JONES ST.   *   2SB

PRESS RETURN TO DISPLAY LABEL AND SHOT
      NX     TO SKIP CURRENT PARCEL
      SEL    TO CHANGE DATA OR BACK UP
```

```
┌─────────────────────────────────────────────┐
│ ┌────────┐                                  │
│ │ MENU 1 │                                  │
│ └────────┘                                  │
│   TYPE:                                     │
│   RETURN - TO DISPLAY WIPE                  │
│   NX (NEXT) - CONTINUE (W/O PICTURE)        │
│   SEL - [ADD, DELETE, BACK, EXIT]           │
│   SELECT ONE:                               │
└─────────────────────────────────────────────┘
```
*FIG. 7A*

```
┌─────────────────────────────────────────────┐
│ ┌────────┐                                  │
│ │ MENU 2 │                                  │
│ └────────┘                                  │
│   SELECTIONS:                               │
│   NOTE - ADD, THEN DELETE TO CHANGE A FILE  │
│   RETURN - TO ADDRESS DISPLAY               │
│   B (BACK) - TO PREVIOUS PARCEL             │
│   A (ADD) - ADDITIONAL CHANGES FILE         │
│   D (DELETE) - DELETION TO CHANGES FILE     │
│   Q (QUIT) - TO EXIT PROGRAM                │
│   CHOICE                                    │
└─────────────────────────────────────────────┘
```
*FIG. 7B*

```
┌─────────────────────────────────────────────┐
│ ┌────────┐                                  │
│ │ MENU 3 │                                  │
│ └────────┘                                  │
│   TYPE                                      │
│   <A> TO MAKE ADDITION                      │
│   <R> TO REENTER ABOVE INFORMATION          │
│   <Q> TO EXIT WITHOUT ADDITION              │
│   SELECT ONE:                               │
└─────────────────────────────────────────────┘
```
*FIG. 7C*

METHOD AND APPARATUS FOR STORING A MASSIVE INVENTORY OF LABELED IMAGES

DESCRIPTION

The present invention relates to methods and apparatus for storing a massive visual inventory of different images, and particularly images which are labeled with identifying text; the inventory being provided on a video disc record having a frame of each video image titled with the label information on a separate frame of the disc record from which the images can be randomly accessed.

The invention is especially suitable for use in gathering labeled images of different sites, such as every real estate parcel in a city. The inventory of such parcels may be used for tax assessment purposes, tourist information, real estate sales and the like. The invention is also suitable for use in recording other images such as aerial views, maps, drawings and other pictorial or graphic displays; random access to which is necessary or desirable.

Heretofore, inventories of pictures have been gathered by employing photography. Slides, prints or motion picture film have been used. All such media require processing before the individual image can be viewed. The photographs must be sorted and labeled well after they are taken. Where hundreds of thousands of images are involved, the cost of such sorting is prohibitive. Also the probability is high that pictures will be lost, let alone mis-sorted. In one system which has been proposed the photographs (films containing the pictures) are translated into video signals and recorded on a video disc. The above-mentioned drawbacks of photographic processes nevertheless remain. The quality of the images is low. Sorting is required in order to allocate the pictures to the frames of the disc, and the pictures on the disc are not titled or labeled in any way.

It has also been proposed to travel along a highway and make surveys by continual recording with a vehicle mounted video camera (see, U.S. Pat. No. 4,396,942, issued Aug. 2, 1983). The video camera output is recorded on a tape recorder. The images are not segregated or ordered in any way such that random access to any selected picture is made available. The recording may only be played back so as to review what the video camera recorded as the vehicle traveled along the highway.

It is the principal object of the present invention to provide an improved method and apparatus for storing a massive visual inventory of different images using electronic means for producing the images which are operative under computer control in accordance with digital information corresponding to each image.

It is another object of the present invention to provide an improved method and apparatus for producing a massive visual inventory of different pictures where the pictures may be gathered on an intermediate medium, such as tape, through the use of a video camera in the field, monitored in the field and ultimately stored on different frames of a video disc to enable random access to any selected picture.

It is a further object of the present invention to provide an improved method and apparatus for producing a massive visual inventory of different images which are individually labeled from digital information, different items of which correspond to different images and which direct or route the gathering of the images with a video camera.

It is a still further object of the present invention to provide an improved method and apparatus for producing a massive visual inventory of different images, each image labeled with accompanying text which becomes part of the image automatically under computer control, which images are stored on video disc for random access thereto.

It is a still further object of the present invention to provide an improved method and apparatus for storing a massive visual inventory of different images which are sorted automatically in accordance with digital information under computer control which guides the order of collection of each picture, which digital information can be changed (corrected or deleted) so as to ensure that labels derived from the digital information and used to electronically title the video images are correct and current in light of the actual image viewable on a monitor.

Briefly described, the invention produces a massive inventory of pictures and text corresponding to each picture for random access and display by storing digital signals representing identifying information and the text for the pictures in memory. The memory is accessed to generate a synchronous "wipeable" video graphic signal for each picture. A TV signal for each picture is generated, as by a video camera in the field, while the video graphic signal is generated. The video graphic signal and the TV signal are then combined to produce a TV signal which is labeled with the text for the picture and can be recorded on a video disc for random access. The combined video signal is preferably recorded on an intermediate medium such as tape. From the intermediate medium, a selected frame of a plurality of frames of each labeled picture is stored and re-recorded on a separate frame of a video disc. Each frame occupies a separate track, when the disc is of the type which is recorded with constant angular velocity, or, otherwise, a portion of a track on the video disc. The location of each frame on the disc corresponds to each labeled picture and enables random access thereto for retrieval and display from the video disc.

The stored digital information defines the route for the video camera to each site where a video image is recorded as on a video tape recorder connected to the camera. For automatic, electronic labeling, the stored digital information is converted into video graphics and wiped on the frame in a predetermined location, such as the bottom of the frame of the video image. In addition, the video recording may be marked or keyed with an audio signal when each picture is shot. The audio signal can be used to select a stable frame of the video image for re-recording on the video disc.

Access to the video disc under computer control may readily be accomplished. For example, when the pictures are of real estate parcels, a dictionary or directory program may be used to generate control signals for a video disc player which selects desired frames; accessing pictures of selected parcels in any desired order, for example parcels of similarly assessed value, adjacent parcels in the same neighborhood, parcels listed for sale and parcels having houses of similar types thereon.

The foregoing and other objects, features and advantages of the invention, as well as a presently preferred embodiment of the invention, and the best mode presently known for practicing the invention, will become more apparent from a reading of the following description in connection with the accompanying drawings in which.

Figure 1:
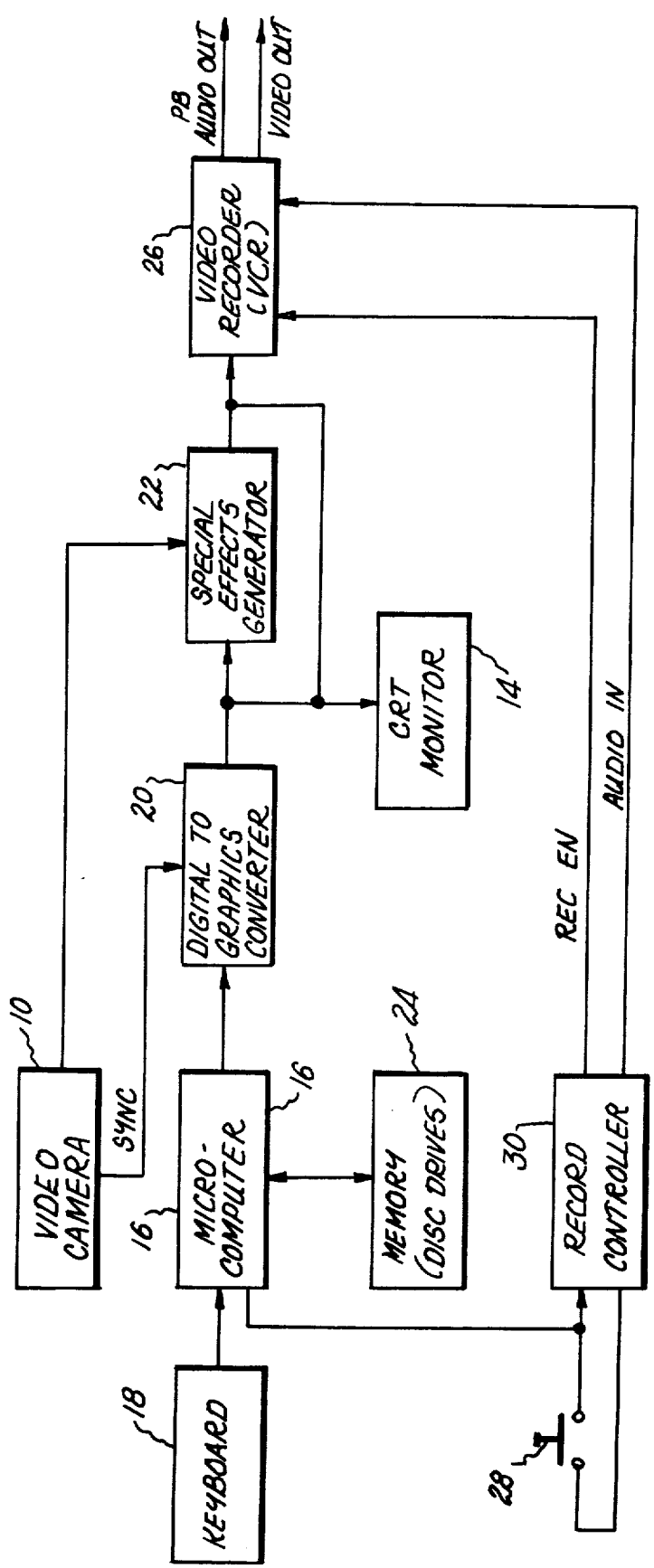
FIG. 1 is a block diagram of the portion of a system (a "field rig"), which may be portable and used in the field to gather a massive inventory of different images, in accordance with an embodiment of the invention.
Figure 4:
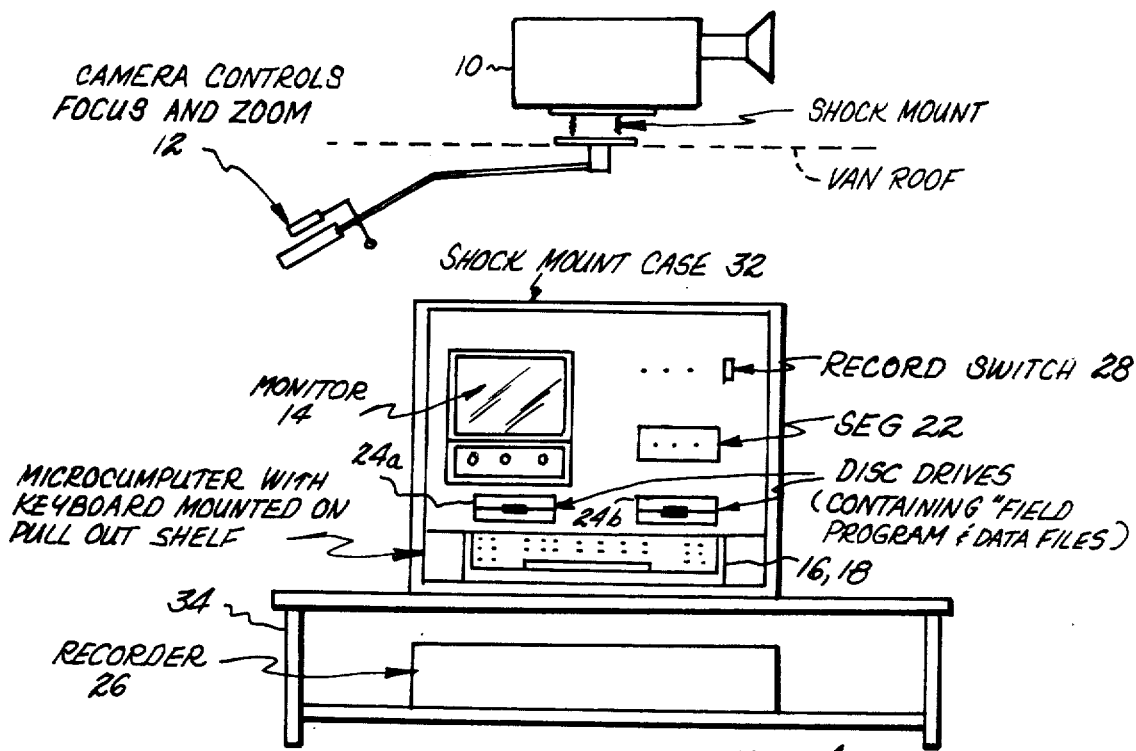
FIG. 4 is a plan view, schematically illustrating an installation of the field rig, in FIG. 1 in a vehicle for use in tne field to gather and label the visual inventory.
Figure 8:
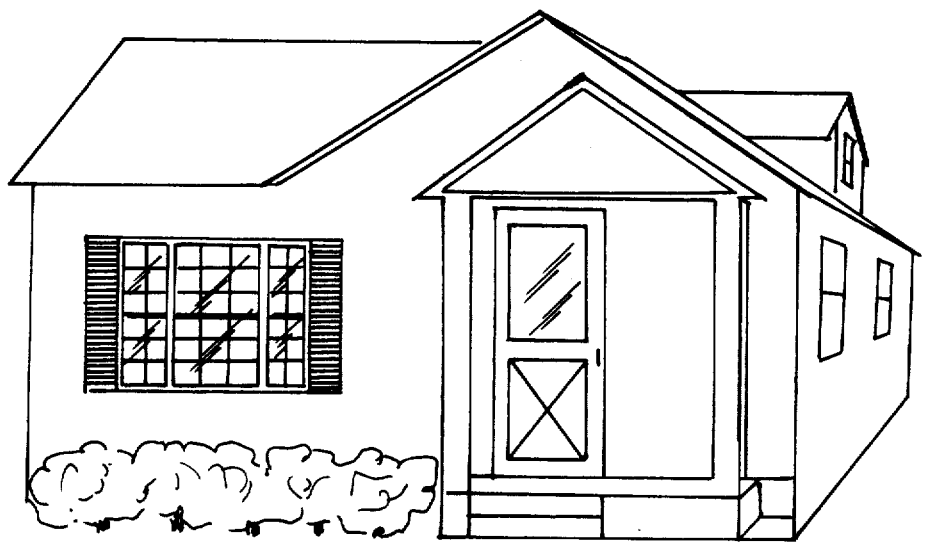

FIGS. 6 A through K are flow charts illustrating the programming of the computer used in the system shown in FIGS. 1 and 4;

FIGS. 7 A through C are displays of menus which appear on the monitor to direct the operator in the gathering of the video images and in the changing or deletion of digital information which dictates the routing and order in which the pictures are shot; and FIG. 8 is a typical labeled picture of a real estate parcel which is obtained upon accessing and playback of the video disc.

Referring to FIGS. 1 and 4, there is shown the portion of the system for gathering a massive visual inventory of pictures, which in this example are real estate parcels. This portion of the system is portable and is used in the field, as a field rig carried in a car, van or other vehicle. A video camera 10 protrudes through the roof of the van and is equipped with rear controls 12 for focusing the camera and control of a zoom lens thereof. The camera 10 and its controls 12 may be of the type which are commercially available. Inside the van there is located a cathode ray tube monitor 14 and a microcomputer 16 with its keyboard 18. The microcomputer output is connected to a digital to graphics converter 20 which is connected to the monitor 14 and also to a special effects generator (SEG) 22. The converter 20 receives sync signals from the video camera 10 and translates the digital information from the microcomputer into analog information which modulates the lines of the picture displayed on the monitor 14. The converter may be a conventional device which derives sync from the video camera and processes the microcomputer output to conform to NTSC standards to form the display on the monitor and to be compatible with the video signals generated by the special effects generator 22. The special effects generator also receives the video signal from the camera 10 and wipes over the graphic information so as to label the picture. The labeled video signal is displayed on the monitor 14. It may be desirable to install a switch which selects either the output of the converter 20 or of the generator 22 for display on the monitor 14.

A first group of programs (control programs) is stored on one floppy disc. These are the "field program" which dictates the processing of digital information in the computer, the changing of the information and the display of the information on the monitor 14. Another program is the disc operating system program, and the third program is a video font program which provides alpha-numeric or graphic displays. Other floppy discs contain data files of digital information relating to the subject images, such as the real estate parcels which may be derived from a main data base such as the data bases available from the tax account records. Such data bases are normally used in the computer system employed by the organizational or governmental unit (the city, county, school district or other taxing unit). This information is down loaded from the main data base onto floppy discs. This data base orders the gathering of the images. In other words, the layout of the images to be gathered may be established when the data file floppy discs are loaded. If the information contained in the main data base is in an order which is to be reflected in the order of images, for example by sections or neighborhoods or address numbers or geographically contiguous streets, the order of the main data base information, copied (or down loaded) onto the data file discs, may be used to order the gathering of the visual inventory (setting the sequence in which the pictures are shot or recorded) and hence the layout of the video disc. Other orders in which the images are to be recorded may, of course, be derived by programming which restructures the down loading of the main data base.

To repeat, there is provided a disc containing the field program, a program for generating video font and the (DOS) disc operating system program (the control programs), which goes in one disc drive, and a number of discs containing the data files downloaded from a main data base, each of which goes in the other disc drive.

External memory for the computer 16, shown at 24 in FIG. 1, is provided by two disc drives 24a and 24b, one for the control program disc and the other for the data file discs; however, a single disc drive may be used. In that case, the control programs are loaded from disc into the computer memory. Then the control disc is removed and a disc containing the data files is inserted in the disc drive and used during the field image labelling and gathering.

A video recorder 26 receives and records the combined output from the special effects generator 22 and the video camera (10). This video recorder may be a commercial video cassette recorder (VCR). When a picture is to be shot, a record switch 28 is depressed. This applies a control signal to a record controller 30. The record controller outputs a record enable (REC-.EN.) pulse to the video recorder 26 and also records an audio tone on an audio track of the video tape. The circuitry of the record controller 30 is illustrated in greater detail in FIG. 2. The microcomputer 16 and keyboard 18, the disc drives 24a and 24b, the monitor 14, the special effects generator 22 and the record switch 28 may be located in a portable shock-mounted case 32 which is placed on a shelf 34 in the van or other vehicle. The recorder 26 may be located on another shelf below the case 32. The video camera can be mounted on top of the case 32 and projects through a hole in the roof of the van.

Figure 3:
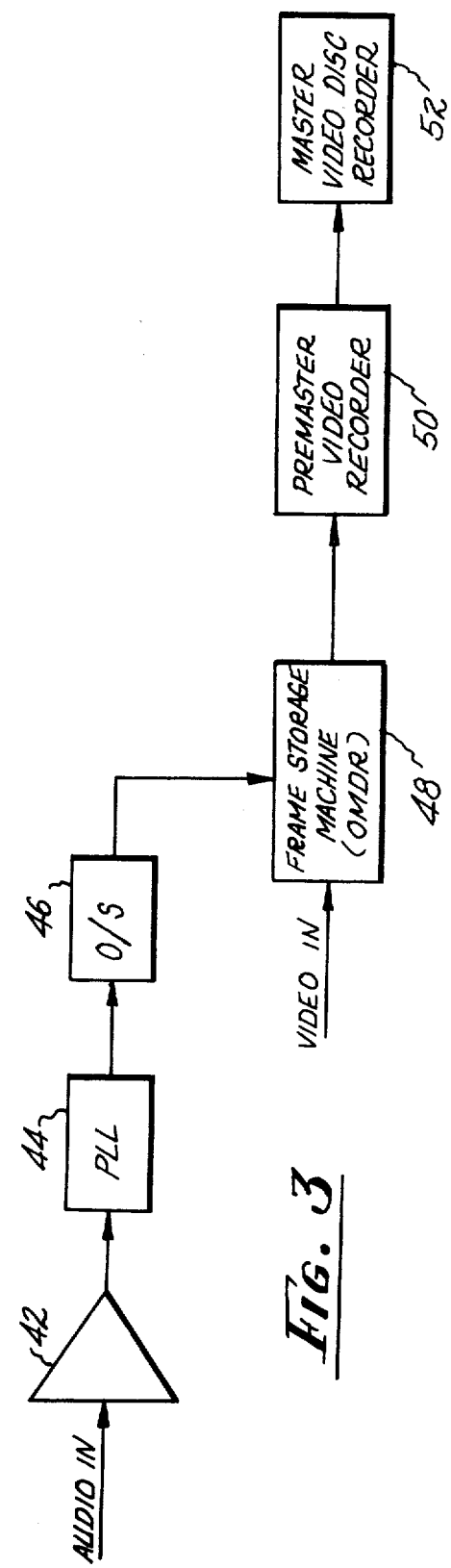
FIG. 3 is a block diagram of a portion of the system which is suitable for use in producing a pre-master video disc record containing the massive visual inventory of different labeled pictures.

It is possible, of course, to use an optical disc recorder like the OMDR 48 used in post-production described in FIG. 3. In that case single labelled images would be recorded in the field, instead of multiple images (plurality) of the same subject recorded on tape by the VCR 26. The use of a VCR 26, however, is presently preferred since a VCR is better adapted for use in the field, since it is less subject to shock and other adverse environmental conditions which may be expected in the field. The optical disc recorder such as the OMDR is then used to post produce the pre-master tape for the video disc or the disc itself. The post-production system will be explained hereinafter in connection with FIG. 3.

Figure 2:
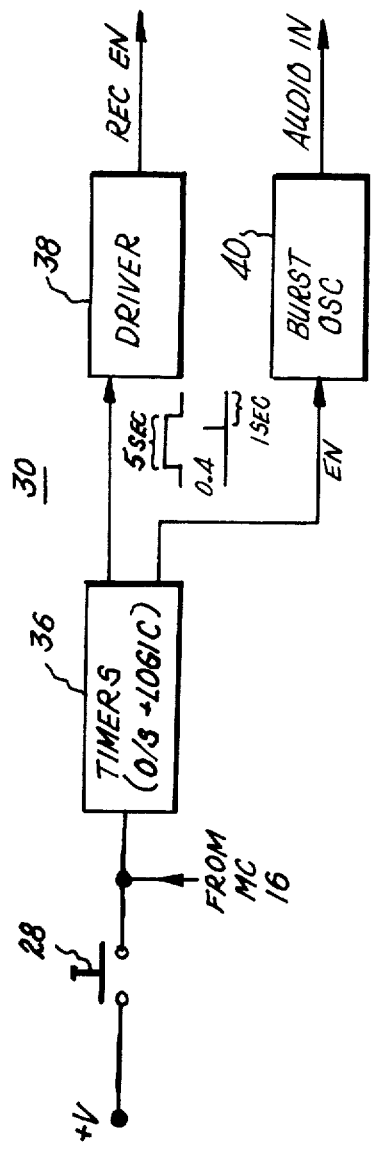
FIG. 2 is a block diagram of the record controller used in the system shown in FIG. 1.

Referring to FIG. 2, the record controller can receive control signals from the microcomputer 16 or a record switch 28. This control signal is a pulse which triggers timer circuits 36 containing one-shots and logic which produces an output pulse of approximately 5 seconds duration and a short pulse of approximately 0.4 second duration, 4 seconds after the leading edge of the 5-second pulse. The 0.4 second pulse then occurs after the VCR 26 is up to speed and stable. The 5 second pulse from the timers 36 is amplified in a driver 38 and provides the REC.EN. control pulse to the VCR 26. The VCR starts and runs for 5 seconds or less, which is the interval during which multiple video frames (30 per second) of the subject or parcel are recorded by VCR 26. When the 0.4 second pulse arrives, the signal will be stable. The 0.4 second pulse enables a burst oscillator 40 which produces an audio tone burst which is recorded on an audio track of the VCR 26. During a 1 second interval starting with the 0.4 second pulse approximately 30 frames of the picture are recorded on the VCR. Approximately 150 frames are recorded during the 5 second record enable interval. The last 30 frames will, be stable and any of these frames may be selected for recording on the video disc.

Referring to FIG. 3, there is shown the post-production system for creating the video disc from the frames which are recorded on the VCR. The cassette which has been recorded in the field is removed from the van and played back in post-production outputting audio and video. The audio output contains the tones from the burst oscillator 40. These tones are amplified in an amplifier 42 and detected by a phase lock loop 44 which is tuned to the frequency of the tones. The phase lock loop outputs tone bursts which trigger a one shot 46. The one shot produces pulses for enabling a frame storage machine 48. This machine may suitably be an optical memory disc recorder (OMDR). This machine may be of the type which is commercially available, for example, from Panasonic. The video input from the VCR goes to the OMDR 48. When an enable pulse from the one shot 46 is applied, one of the thirty frames which follow the pulse is selected and recorded on a frame of the OMDR. A monitor (not shown) may be used to review the recordings on each OMDR track for quality control.

After an entire OMDR disc, with approximately 15,200 usable frames, is recorded, the OMDR is played back at 30 frames per second into a pre-master video recorder 50. This recorder 50 may be a studio recorder which records a one inch video tape of each and every frame in the format required for video disc recording. Several OMDR discs may be played back in the recording of the one inch pre-master tape. This pre-master tape is then used to record a video disc master. This may be a commercial optical recorder 52. The master video disc and replicated copies are produced and commercially available through several manufacturers such as 3M, Sony and Pioneer. There may be over 50,000 frames or single accessible images per side of the video disc which is replicated from the master disc. The master recorder provides frame numbers in the vertical interval of each frame which may be used for accessing the discs on playback. The master discs are reproduced by pressing, injection molding or other commercial process. Accordingly, a massive visual inventory of hundreds of thousands of parcels may be provided on a few video discs, and as many copies of these discs as desired can be produced efficiently, accurately and inexpensively.

Referring to FIG. 8, there is shown a typical image. This is a picture of a real estate parcel. This picture is of a two-story frame house. The picture is labeled with the address and the section and lot number of the parcel. In FIG. 8 the address is 159 Mildorf St., the section is 107 and the lot is 65. This parcel can readily be accessed from the video disc by a directory system which generates a call code to a video disc player. The call code searches the frame number on the video disc which is available from a directory which correlates addresses or section and lot numbers with the frame numbers. Directory or dictionary programming may be used in any computer system for generating the call codes to select any image for viewing. These programs may be written to select, for example, parcels having similar assessed valuations, parcels containing houses of similar types, parcels which are available for sale, and etc. Such programs may be adopted to search through a neighborhood for parcels adjacent or across the street from a parcel of interest or any other search scheme as may be necessary or desirable.

Figures 5, 6I:
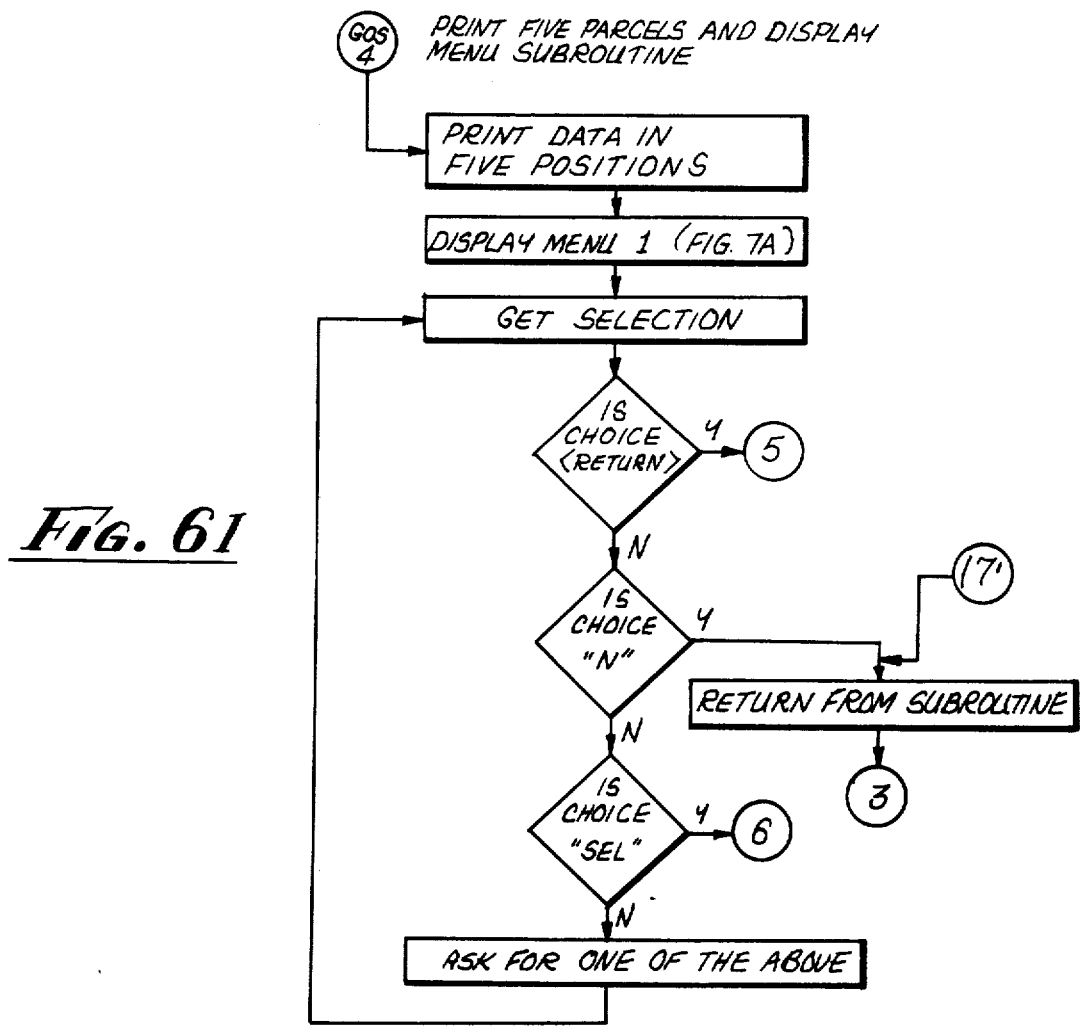
FIG. 5 is a display which is produced on the monitor of the system shown in FIGS. 1 and 4 which directs the routing of the vehicle and the order in which the pictures are shot by the video camera.

The field program mentioned above not only routes the field rig (image collection system) but also contains an operator aids screen on the monitor 14. A typical operator aids screen is shown in FIG. 5. Five parcels are displayed, each with a descriptive code. The two parcels previously recorded are listed first and are indicated by a single asterisk. The parcel which is annotated by double asterisks is the current parcel which is ready to be shot or recorded. The next two parcels are the upcoming parcels and are also denoted with single asterisks. The descriptive codes contain information from the data base relating to the subject image and is used by the operator to make sure that the video camera 10 is viewing the correct subject or property. For example, 2SB stands for 2-story brick, 2SA stands for 2-story aluminum, and 1SB stands for one-story brick. Should a parcel be a vacant lot, an instruction may be displayed to that effect and may be an instruction not to record that vacant lot (NO PIC).

The computer is programmed to generate various menus for prompting the operator. These menus are displayed on the monitor 14. Three menus are shown in FIGS. 7A, B and C. Menu 1 is displayed with the parcel descriptions and is also shown in FIG. 5. This menu gives three choices. The first is "press to return to display label and shoot." As indicated in FIG. 7, a display wipe occurs when return is pressed on the keyboard 18. This causes the special effects generator to wipe the label (the street address, section and lot numbers) in the lower segment of the video frame; roughly the bottom 90 video lines. This image is then displayed on the monitor. If the image is satisfactory and is the next image to be shot, the operator presses the record button 28, or an appropriate key may be used on the keyboard to generate the control pulse for operating the record controller and enabling the video recorder 26 to record the shot.

The next instruction is NX to skip current parcel. The operator will type NX on the keyboard and the program will skip to the next parcel. This is used if there is a NO PIC instruction on the screen, as for a vacant lot. The program may be arranged so that two key strokes of NX are required for the program to skip the current parcel to protect against an accidental step.

The last instruction is "SEL". Typing S-E-L and return on the keyboard brings a menu to the screen which offers several selections. The first selection "RETURN" cancels the menu and brings back what had been the target data and image label, otherwise the operator may enter a "B", "A", "D" or "Q" on the keyboard 18. "B" stands for "back" and targets the previous image information and label. For instance, the previous parcel will then appear in the position of the current parcel (between double asterisks as shown in FIG. 5). "A" stands for "add", used to add an image or parcel not included in the data file, as though it were there to begin with, with a suitable label for the new shot. "D" stands for "delete" used to delete a scheduled image from the data file since it is found not to exist in the field. "Q" stands for "Quit" and when entered the program is exited. This selection is made after completing a data file disc or after a days' shooting is completed in the middle of a data file disc. There is another selection indicated in FIG. 7B as "choice" which allows for minor changes to the data in the data file.

The program in this embodiment of the invention is arranged so that a change is made by following the add step and then deleting the incorrect property digital information from the data file.

A record or changes file is kept of deletions and other changes for use in updating the main data base from which the data disc was down loaded. This changes file may be stored on the data file disc in a sector thereof specifically allotted to changes.

The program will be more apparent from the flow charts contained in FIGS. 6A through 6K. Connectors between various parts of the program are indicated by corresponding numerals and their primes. For example, the program can proceed from (1) in FIG. 6A to (1') on FIG. 6B and from (3) on FIG. 6A to (3') on FIG. 6B.

When the computer is turned on, the program initializes the print font from the control disc (drive 24a) and prompts the operator to insert the file name. The program then has steps to assure that the proper disc drive (24a or 24b) FIG. 4 is selected. The program prompts the operator to insert the changes file name for each field recording session. The operator then types in a change file reflecting that particular session for example, the first session or shift on a given day may receive the letter "A" and the month digit and the day without spaces or punctuation, i.e. the first shift's change file on March 1 would be "A31", the next shift's change file on the same day would be B31. On the following day the first change file would be A32.

Figure 6A:
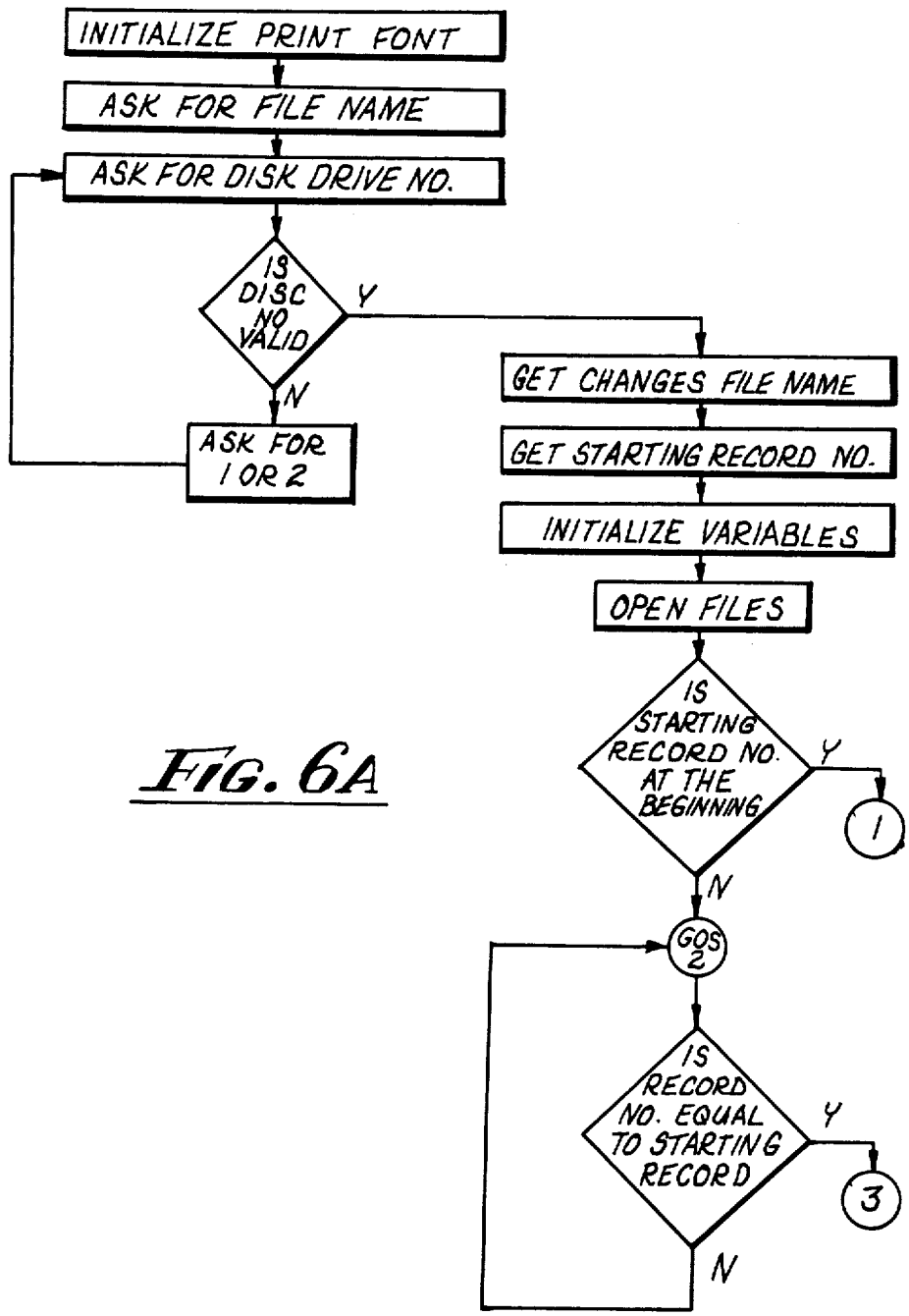

For the beginning of each route in the field or each shift within the route, the operator enters the starting record numbers, consulting an off-line list. The variables, street names, lot numbers and the like, are initialized and the files are opened, which means that the information from the discs is placed in computer memory. If the starting record is at the beginning of the data file, the program proceeds to blank the slots reserved for the two previous parcels shown on the operator aids screen (FIG. 4) and displays only the target image or parcel. If the starting image record is not at the beginning, a search procedure is used to access the image data. This procedure is indicated in FIG. 6A as GOS2. This is a subroutine for reading out the digital information for each parcel and is shown in FIG. 6G.

Figure 6B:
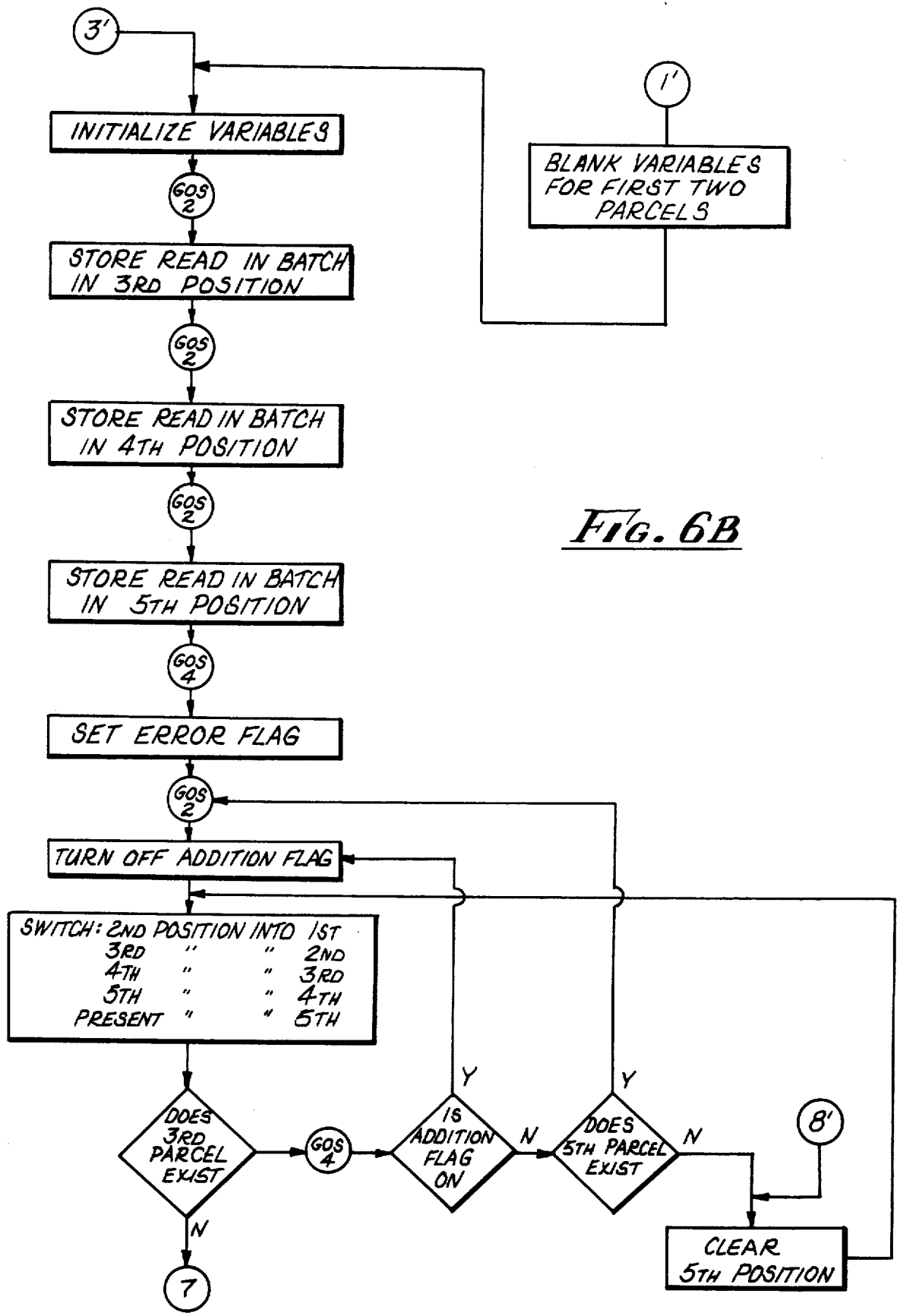
Figures 6C, 6D:
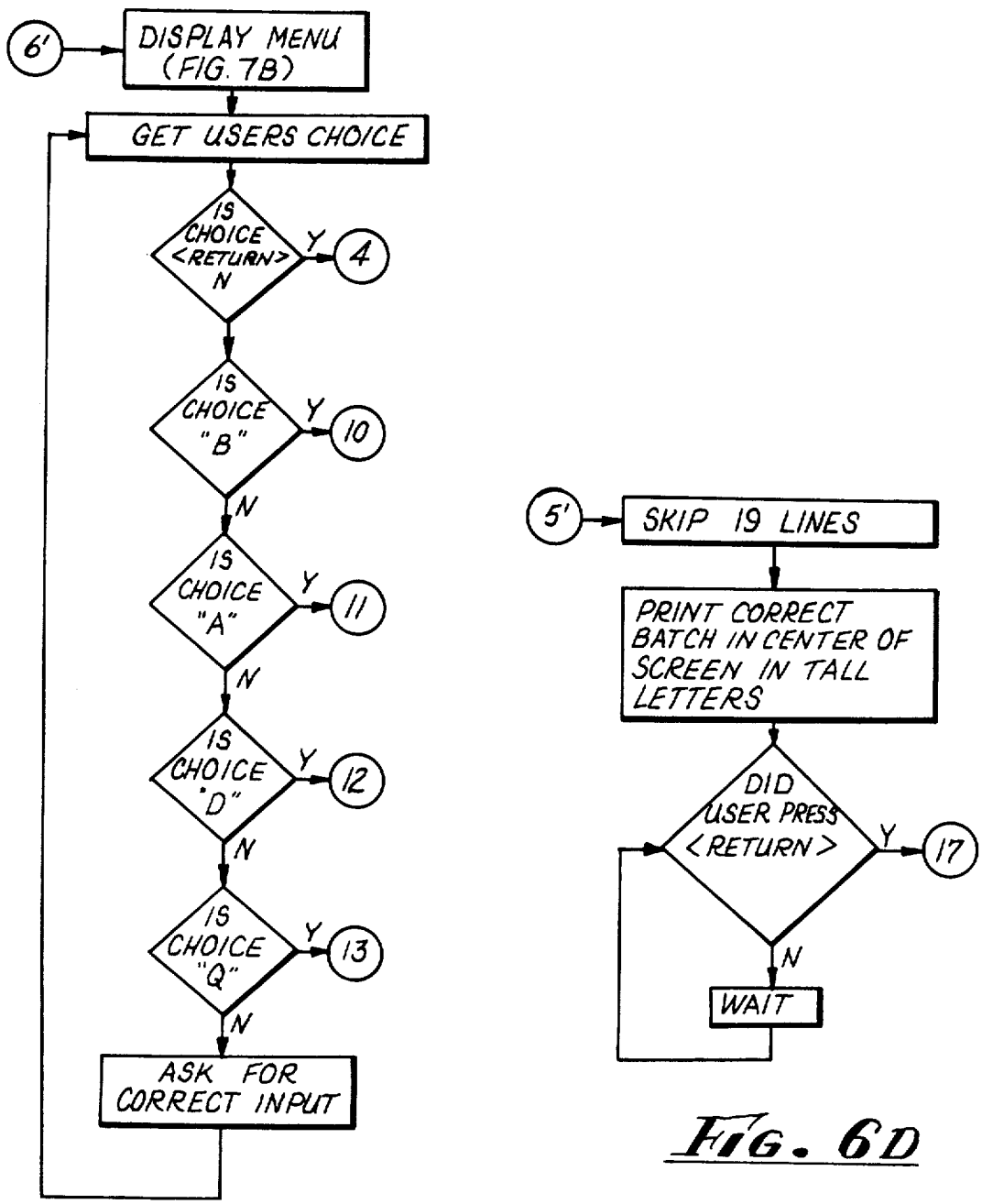
Figure 6E:
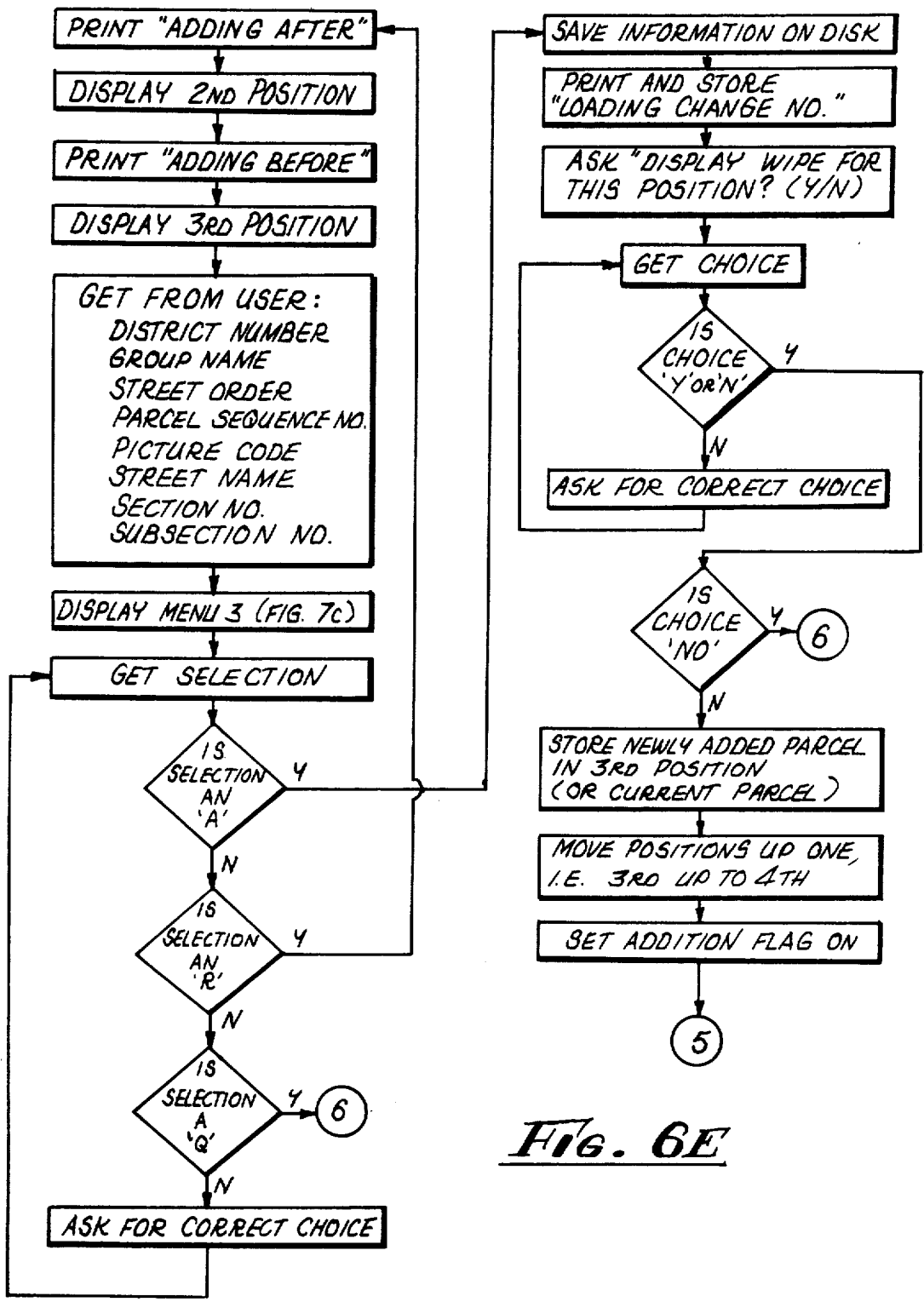
Figure 6F:
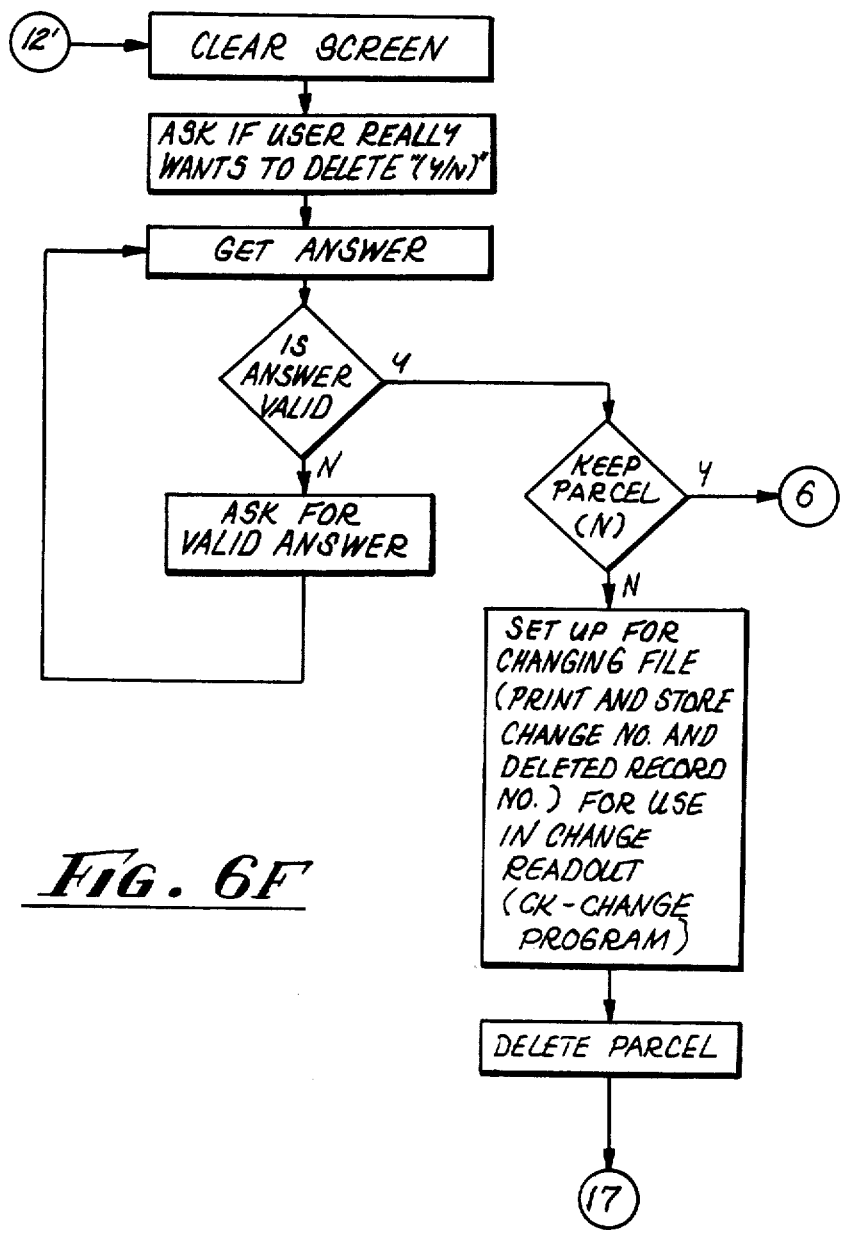
Figure 6G:
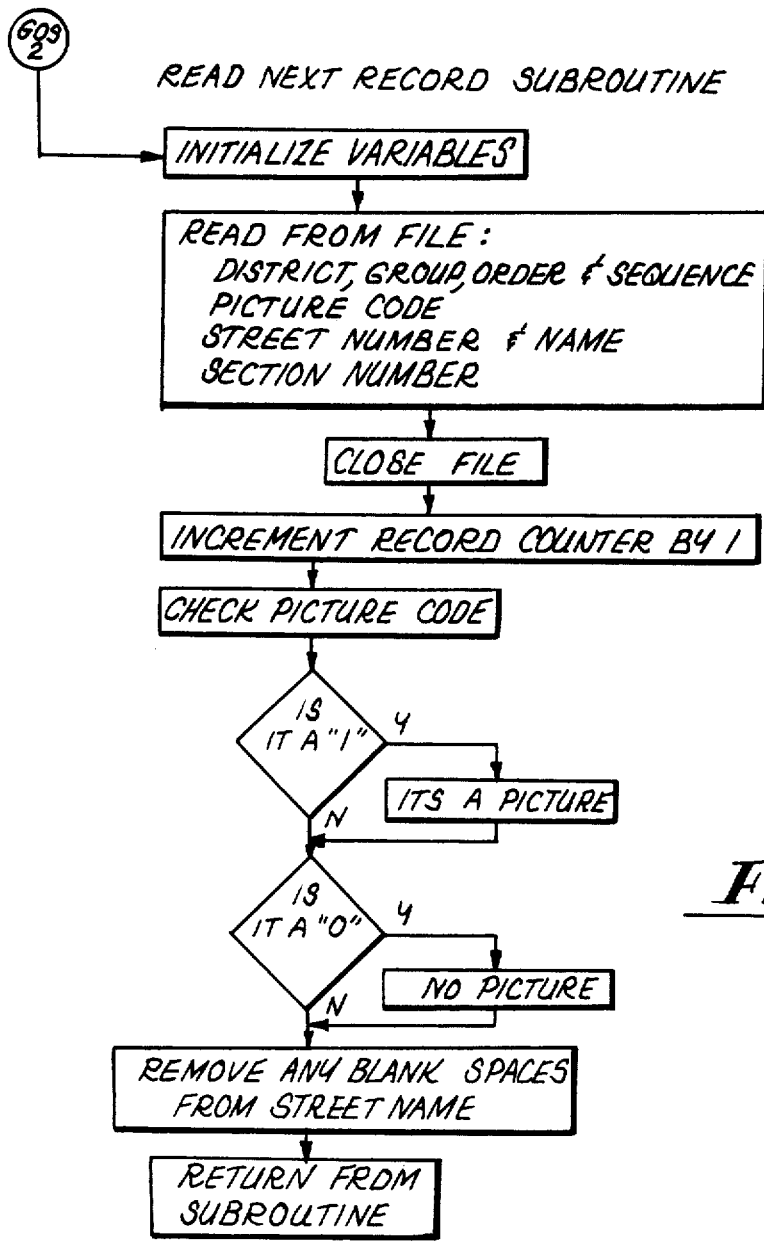

As FIG. 6G shows, the variables are initialized on every read. Then the information as to each parcel is read from the file. This is the district group order and sequence number, the picture code (1SB, 1SA, etc.), the street number and name and the section and lot number. The records are read until a number equal to the starting record number is accessed. Then the program generates the displays shown in FIG. 5 in the various positions. A reading routine occurs to read out the information onto the display for each position.

Once all of the positions are read out, the program proceeds to GOS4, which is the subroutine illustrated in FIG. 6I. This prints out the five parcels and displays the menu shown in FIG. 5. Each selection of Return, NX or SEL leads to a different subroutine. The Return subroutine is illustrated in FIG. 6D. This causes the address and section and lot number label to be moved to the proper place in the screen (see FIG. 8). If Return is again pressed, the menu on FIG. 4 and FIG. 7A is again displayed. Thereafter the program will automatically generate the label/wipe (the street address, section and lot number) for recording with the camera image, thereafter another return will access the next parcel automatically, and process it in the same way.

If the "NX", is entered the current parcel is skipped and the program proceeds to (3') at the top of FIG. 6B;- causing the image or parcel information on the operator aid display to move ahead one position. It will be noted that the connection between (17) and (17') provides a similar move up as just discussed, when return is pressed twice.

Figure 6H:
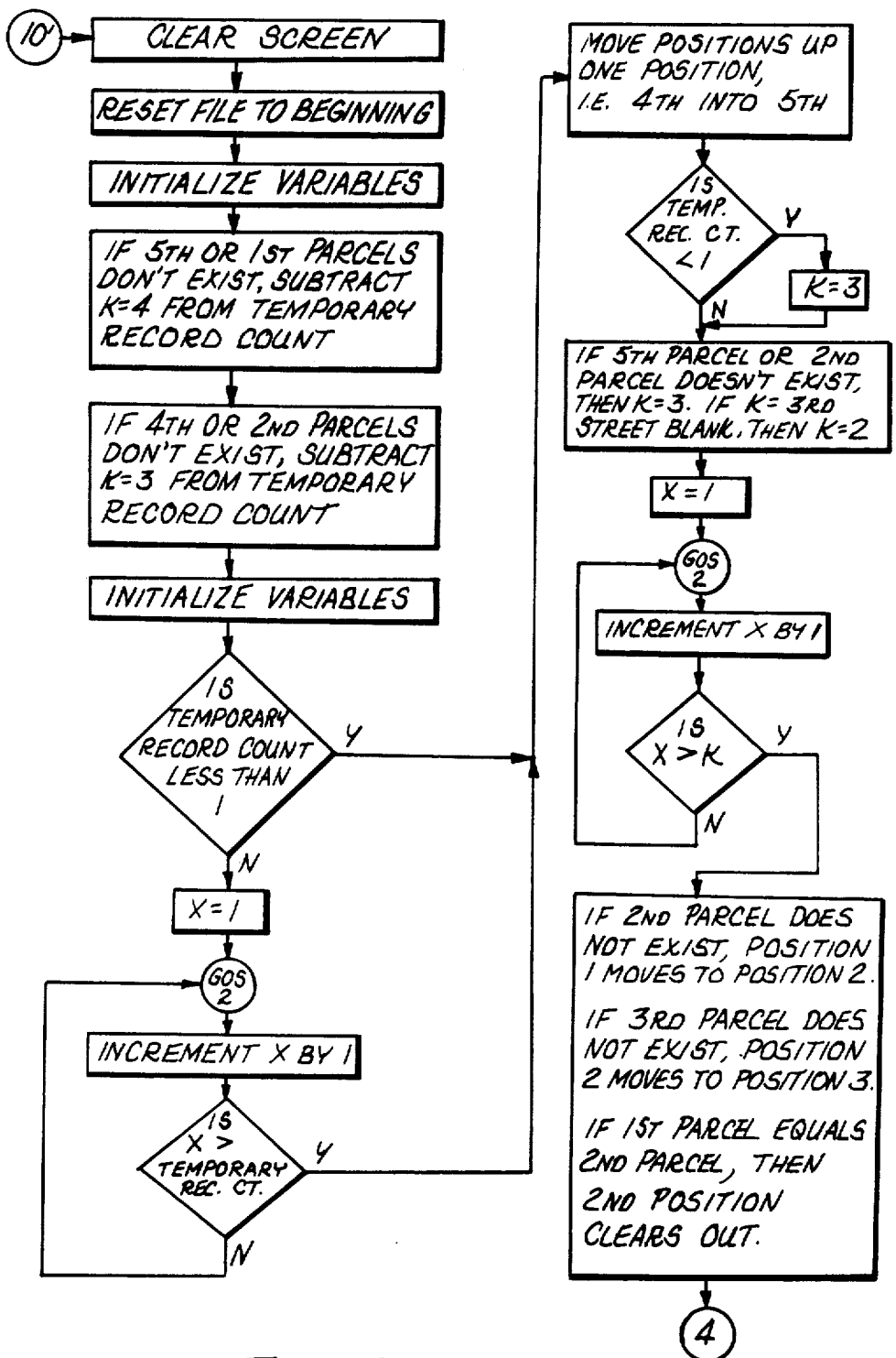

As previously mentioned, if the "SEL," is entered the program proceeds as is indicated in FIG. 6C which causes the menu shown in FIG. 7B to be displayed. This provides choices of Return, B for back, A for add, or Q for quit. If none of these selections are made, the program will prompt the operator to make another selection and the program loops again through the choice decisions. If the choice is "Return," the program proceeds back to FIG. 6I and causes the menu to be displayed together with the five parcels as shown on the operator aids screen (see FIG. 5). If the choice is Back, the program will review the entire file. This review routine is illustrated in FIG. 6H. A review routine is used in this program since random access to the data file disc is not used, rather the digital information for each parcel is stored successively as laid out and the entire file must be scanned in order to get to the previous parcel position.

If the choice is "A" for addition, the program proceeds to FIG. 6E. This routine displays the menu shown in FIG. 7C. The program also displays the identifying information as to the parcels on either side of the parcel where an addition is to be made. The information as to "adding" after, adding before and the corresponding parcel numbers of the parcels on either side are displayed as well as the parcel where the change is to be made. The operator then enters the information which he obtains from the user (the city or other user) as to image order on the disc, i.e., routing, such as the district number, group name, street order, etc. of the parcel to be added.

Then, the menu shown in FIG. 7C appears to prompt the operator to select "A" for addition, "R" to reenter the same information which was displayed or "Q" to exit the program without addition. If an addition is selected, the user information which was displayed as to the parcel to be added is saved and print and store loading change number appears on the screen. If a parcel or image is added the program displays the request "display wipe for this position?" by typing in "y" (yes) or "n" (no) the program is instructed as to whether or not to proceed through the storage of the newly added parcel and move all the parcels up on the display. If "y", an addition flag is set to flag the change in the changes file program. The program then proceeds to FIG. 6D to generate the label/wipe for the camera image. If the choice is "no" the program proceeds back to FIG. 6C which again enables different selections to be made with respect to the added parcel.

A reenter or "R" choice merely clears any mistaken entries and recycles through the add program.

Figure 6J:
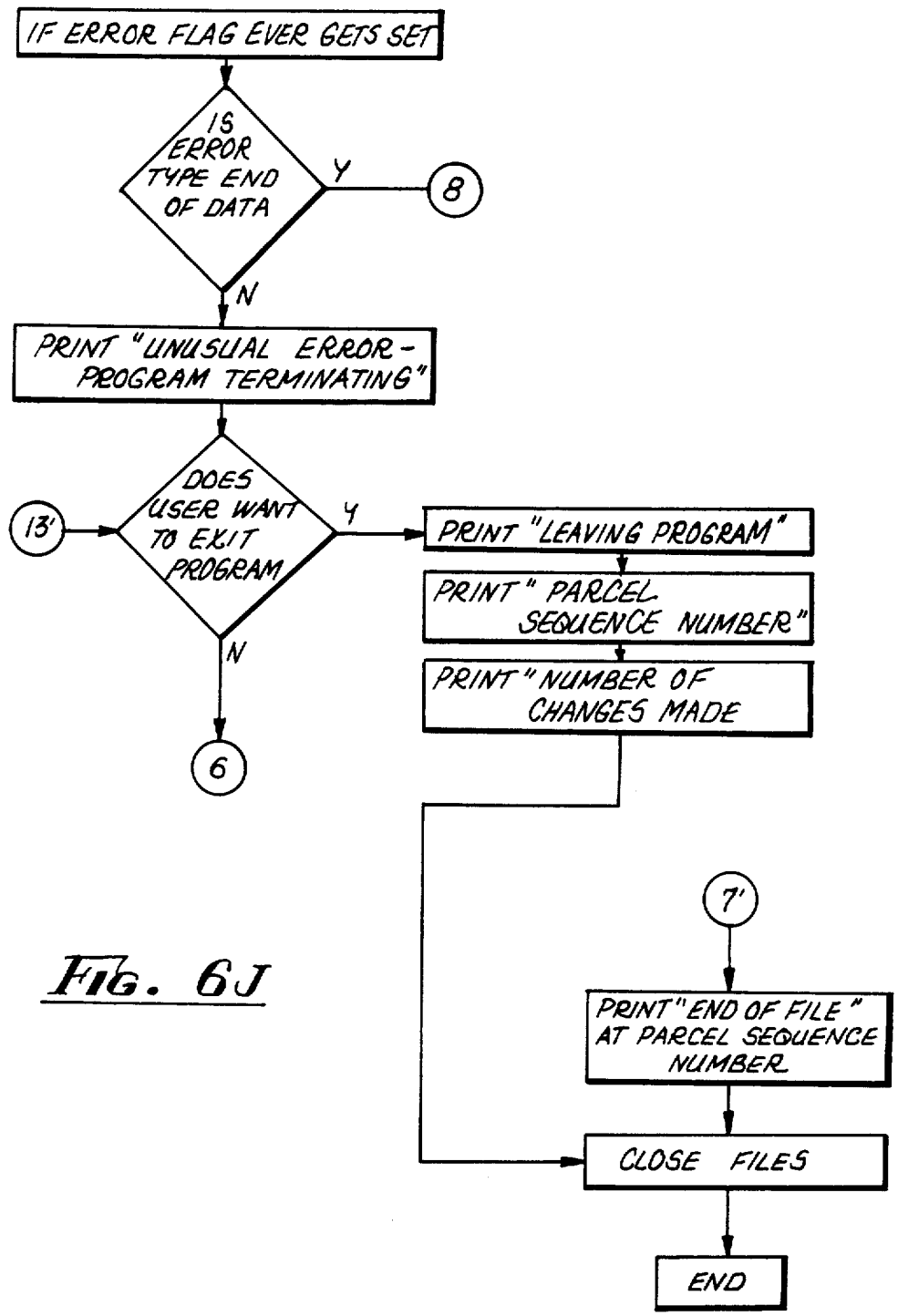

The quit routine is illustrated in FIG. 6J. It will be noted that the quit routine is entered if an error flag is set which occurs in the event of any failure in the computer or the disc drives. If an error flag is set at the end of data, that is the end of a file, and the program proceeds back through the lower half of FIG. 6B. The final position or fifth position is cleared, a check is made to see that the parcels are properly aligned. If they are all aligned, the program proceeds to the bottom of FIG. 6J the display prints end of file and the parcel sequence number at the end of the file which is noted by the operator on a report form so the next shift knows where to begin. The files are then closed and the program shuts down.

If the data is not properly aligned, the program circulates back through GOS4, which is shown in FIG. 6I and opportunity is made to continue with the shooting or other facilities provided by the program. Facilities are made for turning off any addition flags and to assure that an actual parcel exists in the fifth position before the program can be quit.

Returning again to FIG. 6C, if the choice is "D" for delete, the program proceeds to FIG. 6F. The operator is queried to assure that he really wants to delete a parcel. If a parcel is not to be deleted, the program proceeds back to enable choice selection (see FIG. 6C). The deleted parcel is noted by setting up the changes file. The display prompts the operator to print and store the changed number and the deleted record number for use in change read out. After the parcel is deleted, the program can proceed through (17) and (17') via FIG. 6I back to FIG. 6B to continue shooting successive parcels along the route defined by the sequence of parcels on the data file.

As shown in FIG. 6J, there are other ways to exit the program. For example, if the choice is "quit", exit is from FIG. 6C through FIG. 6J. Upon exiting the program, the display will print "leaving program" and the last parcel sequence number, as well as the number of changes made. As indicated above this may be noted by the operator so that he can begin the next days' shooting at the next succeeding parcel.

Figure 6K:
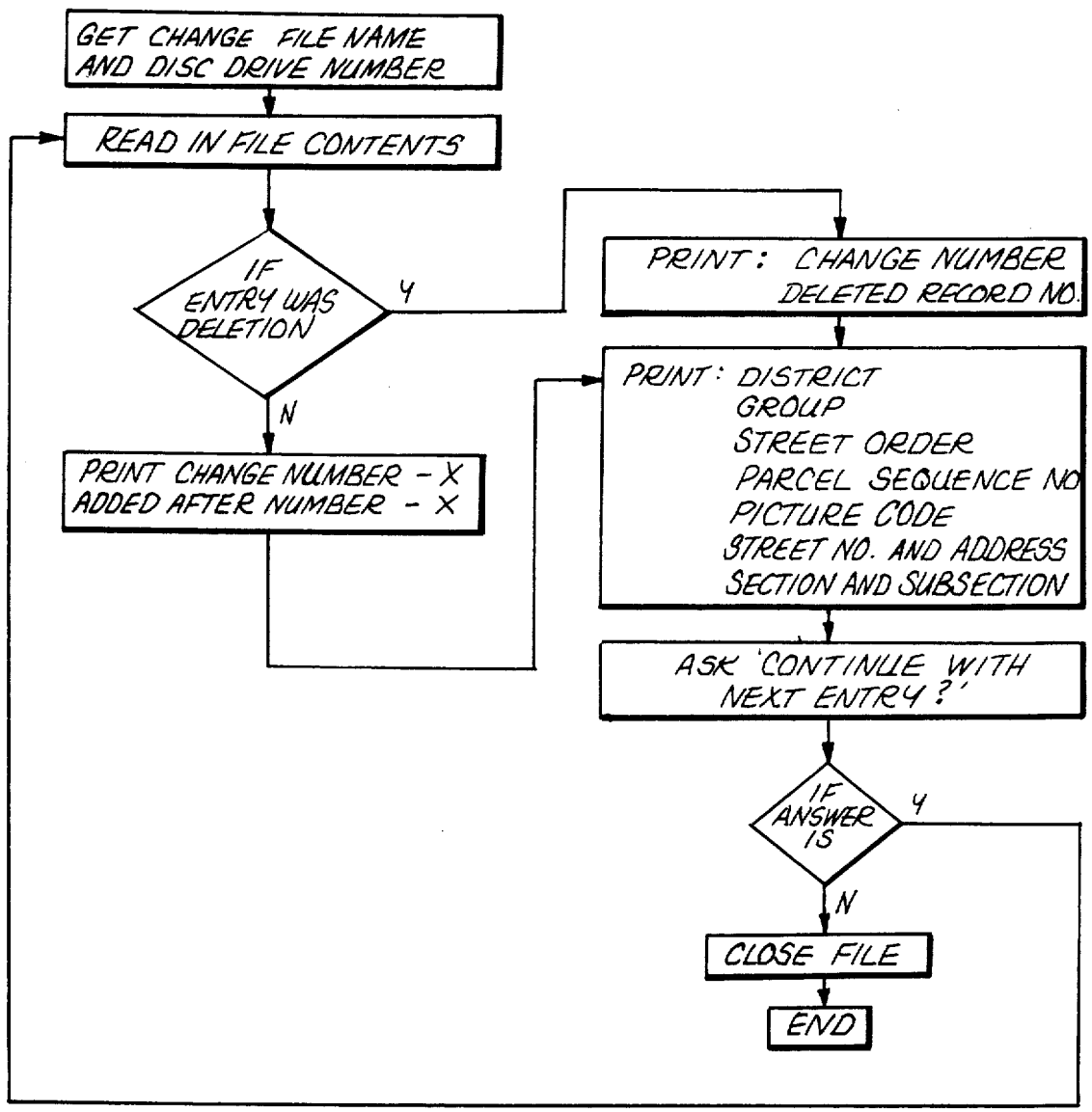

FIG. 6K illustrates the program for reading the changes file which gives information as to the record number of the parcel which is changed and what has been changed so that the main data base may be updated.

To the extent not described in detail, the program will be apparent from the designations on the flow charts.

From the foregoing description it will be apparent that there has been provided an improved method and apparatus for gathering a massive visual inventory. In the herein described method and apparatus, the visual inventory is of real estate parcels. It will be appreciated that other graphic and pictorial information can be inventoried through the use of the invention. Variations and modifications of the herein described method and apparatus in order to accommodate such different pictorial information is clearly within the scope of the invention and will be apparent to those skilled in the art, together with other variations and modifications of the herein described method and apparatus which are within the scope of the invention. Accordingly, the foregoing description should be taken as illustrative and not in a limiting sense.

We claim:

1. The method of gathering a massive visual inventory of different images with the aid of a computer system having digital data processing, storage and display means which comprises storing a data file containing different digital information corresponding separately to said different images, accessing with said data processing means said digital information for a succession of said images, translating said accessed digital information into successive visual displays on said display means displaying human readable information with respect to said images, monitoring said displays, scanning said images with a video camera successively in an order corresponding to the order of the displays of said accessed digital information to produce a sequence of tv signals each for a different one of said images, and producing a video disc record containing a plurality of frames from said tv signals, each image on a different frame of said video disc record.

2. The method according to claim 1 further comprising labeling of said sequence of TV signals of said images with text from at least part of the accessed digital information corresponding thereto such that said frames contain identifying labels with said images.

3. The method according to claim 2 further comprising the step of changing or deleting digital information in said data file when the display thereof is being produced on said display means.

4. The method according to claim 1 wherein said images are scenes of different areas, such as real estate parcels, and further comprising the step of moving said video camera along a route dictated by said displayed digital information to enable the scanning of said scenes in the order corresponding to the order in which said digital information is accessed.

5. The method of producing a massive inventory of pictures and text corresponding to each picture for random access and display with the aid of a computer system having digital data processing, memory and display means, which comprises the steps of storing in a data file the text for the pictures in said memory means, accessing with said data processing means the memory means to generate a video graphic signal of the text for each picture, generating a tv signal of the picture while said video graphic signal is being generated, combining said tv signal and video graphic signal for each picture to produce a combined tv signal, producing a recording of said combined tv signal of each picture, each on a separate frame of a video disc which frame is randomly accessible.

6. The method according to claim 5 wherein said producing step comprises the steps of recording successions each containing a plurality of frames of said combined TV signal for different ones of said pictures and text therefor on a video tape recorder, storing a selected frame from each of said pluralities, and recording of each of said stored frames on a separate frame of said video disc record.

7. The method according to claim 6 wherein said producing step further comprises the step of recording said stored frames successively on a second video tape record for use in recording a master video disc with signals played back from said second video tape record.

8. The method according to claim 6 further comprising recording control signals marking certain of each of said plurality of frames on the audio channel of said video tape record, and storing said selected frames with the aid of said control signals.

9. A system for gathering a massive visual inventory of different images using information from a data base containing different entries of digital information describing each of said images, which comprises a computer having memory means for receiving and storing a file containing said different entries of digital information corresponding separately to each of said different images, said computer having means for accessing said digital information from said memory means, said computer having display means, said computer also having means for translating said digital information into successive different visual displays of said entries in human readable form, video camera means for scanning said images successively in an order corresponding to the order of the displays of said digital information of said entries to produce a sequence of tv signals each for a different one of said images, means for monitoring said tv signals to display said images, and means for producing a video disc record containing a plurality of frames of different ones of said tv signals, each image on a different frame of said video disc.

10. The system according to claim 9 further comprising means for labeling of said sequence of tv signals with text from at least part of the digital information entries in said file in said memory means corresponding thereto such that said frames contain identifying labels with said images.

11. The system according to claim 10 further comprising means in said computer for changing or deleting digital information respecting said entries when the display thereof is being produced on said display means.

12. The system according to claim 9 wherein said images are scenes of different areas, such as real estate parcels, and further comprising means for moving said video camera along a route dictated by said digital information to enable the scanning of said scenes in the order corresponding to the order in which said digital information is accessed.

13. A system for producing a massive inventory of pictures and text corresponding to each picture for random access and display which comprises digital data processing means including memory and display means, means in said processing means for storing in said memory means the text for the pictures, means in said processing means for accessing the memory means to generate a video graphic signal for each picture, means for generating a tv signal of the picture while said video graphic signal is being generated, means for combining said tv signal and video graphic signal for each picture to produce a combined tv signal, and means for producing a recording of said combined tv signal of each picture, each on a separate frame of a video disc record, to enable random access to each picture and the test therefor for retrieval and display thereof from said video disc.

14. The system according to claim 13 wherein said producing means comprises video recorder means for recording successions each containing a plurality of frames of said combined TV signal for different ones of said pictures and text therefor, means for storing a selected frame from each of said pluralities, and means for recording of each of said stored frames on a separate frame of said video disc record.

15. The system according to claim 14 wherein said producing means further comprises means for recording said stored frames successively on a second video tape record, and means for recording a premaster video disc with signals played back from said second video tape record.

16. The system according to claim 14 further comprising means for recording control signals marking certain of each of said plurality of frames with the audio channel of said video recorder, and means responsive to such control signals for storing said selected frames in synchronism therewith.

* * * * *